United States Patent Office 3,139,900
Patented July 7, 1964

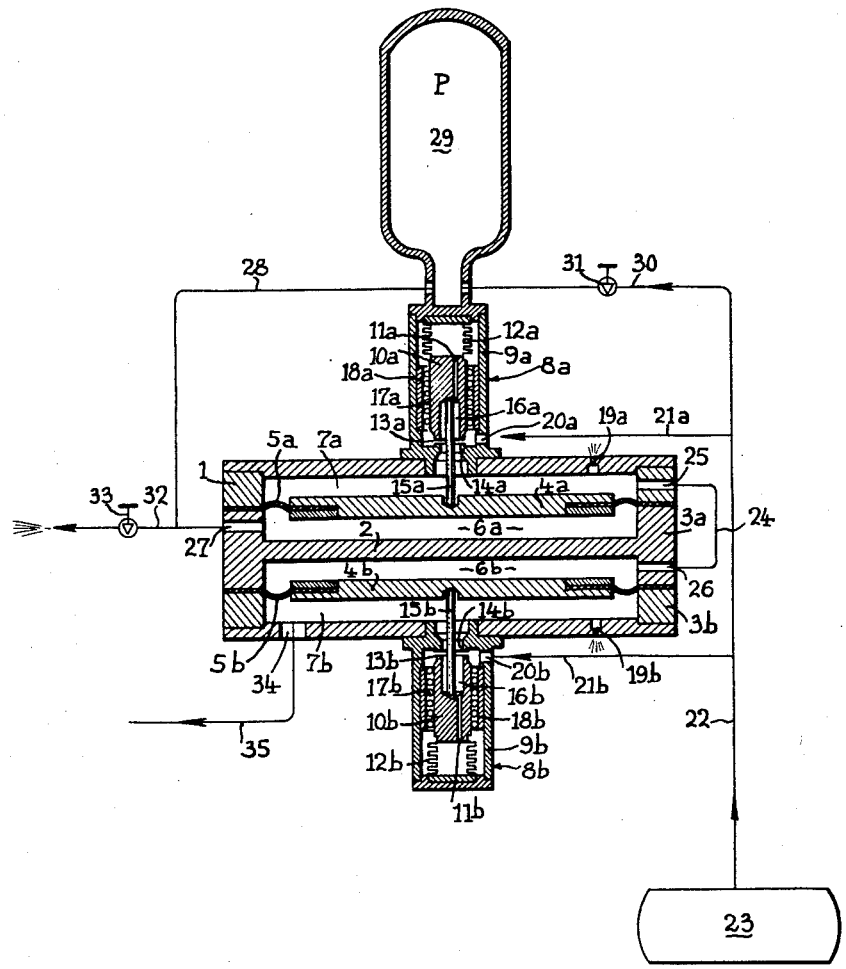

3,139,900
BALANCED AIR LOADED AIR PRESSURE
REGULATOR
Paul Karing, Franconville, France, assignor to Bronzavia
S.A., Courbevoie, France, a French body corporate
Filed May 31, 1961, Ser. No. 113,893
Claims priority, application France May 30, 1960
3 Claims. (Cl. 137—505.18)

The invention relates to an air pressure regulator which is adapted to be inserted between a supply device supplying gas under pressure and a utilization apparatus or system and maintains an output pressure substantially constant independently of variations in the inlet pressure and in the outlet flow when these variations rest within certain limits corresponding to the normal operational conditions of said apparatus.

The object of the invention is in particular to provide an apparatus of this type which has high precision, that is, an apparatus in which the variations in the outlet pressure are very small relative to a given theoretical regulation pressure.

The air pressure regulator according to the invention comprises a first and a second regulator, consisting respectively of a pilot regulator and a main regulator, each of said first and second regulators comprising a reference pressure chamber and a regulated pressure chamber, said two chambers being separated by a movable wall controlling a regulating valve, the regulated pressure chamber of the first regulator communicating with the reference pressure chamber of the second regulator, the reference pressure chamber of the first regulator communicating with a buffer compartment or chamber and the regulated pressure chamber of the second regulator communicating with the utilization apparatus, the valves of said first and second regulators being fed with the compressed gas supplied by the supply device.

Further features and advantages of the invention will be apparent from the ensuing description, with reference to the accompanying drawing to which the invention is in no way limited.

The accompanying drawing is an axial sectional view of a regulator according to the invention.

In the illustrated embodiment, the air pressure regulator comprises a body 1, consisting of a case internally divided by a fixed partition wall 2 into two regulators, namely, a first regulator 3a, which constitutes a pilot regulator and a second regulator 3b, which constitutes the main regulator.

Pilot regulator 3a is divided in the known manner by a movable wall 4a supported by a flexible diaphragm 5a, into two chambers, namely, a reference pressure chamber 6a and a regulated pressure chamber 7a. The wall 4a controls a regulating valve 8a located in a housing 9a fixed to the case and communicating with the chamber 7a. Slidable in the housing 9a is a valve slide 10a provided with an aperture 11a communicating at one end with a bellows 12a located in the housing 9a and at its other end with the interval 13a of a feeler having a variable section formed between the end of the slide 10a and a fixed seating 14a formed in the housing 9a. Said slide 10a can be controlled by means of a needle 15a which bears, on the one hand, against the wall 4a, and, on the other hand, against the end of a cavity 16a formed in the slide.

Friction between the slide and the housing in its longitudinal movement of translation is reduced by balls 17a disposed between the slide and the inner wall of the housing, or the wall of a cylindrical cage 18a applied against this inner wall.

The chamber 7a communicates with the exterior atmosphere by way of a calibrated escape orifice 19a; the housing 9a comprises an inlet orifice 20a to which is connected a pipe 21a in turn connected to a pipeline 22 fed by a source of compressed gas 23.

The regulator 3b possesses elements which are similar to those of regulator 3a and are designated by the same reference numerals as those of regulator 3a, followed by the letter b instead of a; the orifice 20b is also connected to the source 23 by way of a pipe 21b.

The chamber 7a communicates with the chamber 6b through a pipe 24 which interconnects the orifices 25 and 26.

The chamber 6a comprises an aperture 27 putting said chamber into communication by way of a pipe 28 with a buffer compartment or chamber 29 which can be fed with compressed gas by way of a pipe 30 connected to the pipe-line 22 and controlled by a valve 31.

The volume enclosed in the compartment 29 and the chamber 6a can be put into communication with the atmosphere by way of a pipe 32 controlled by a valve 33.

The chamber 7b comprises an outlet aperture 34 connected by a pipe 35 to the utilization apparatus or device (not shown in the drawing).

The presently-described air pressure regulator operates in the following manner:

It will first be noticed that the pressure P in the compartment 29 can be regulated at a given value between atmospheric pressure and the pressure of the source 23 by means of the inlet valve 31 and of the escape valve 33. When these valves are closed, the volume enclosed in the compartment 29 and the chamber 6a constitutes a volume whose pressure is maintained at a value P which is substantially constant if fluid-tightness of the valves 31 and 33 is suitably achieved.

If the compartment 29 has a large volume relative to the volume of the chamber 6a, it can be assumed that the movements of the movable wall 4a do not substantially modify the volume 29+6a and the initial pressure P established in this volume is substantially independent of the movements of the movable wall 4a.

It is assumed that a pressure drop occurs in the chamber 7b, due, for example, to an increase in the flow in the pipe 35, the movable wall 4b will tend to move downward (the apparatus being assumed to be in the position shown in the drawing) and the needle 15b will move the slide 10b away from its seating, which will cause the section of the interval 13b to increase and thus increase the inlet flow in the chamber 7b of the gas under pressure (arriving by way of the pipe 21b) until a position of equilibrium is established between the pressures of the chambers 6b and 7b.

Now, a movement of the wall 4b causes a slight pressure drop in the chamber 6b and consequently an arrival of gases from the chamber 7a by way of the pipe 24.

Consequently, the wall 4a flexes and, on acting on the slide 10a, causes arrival of gases by way of the pipe 21a until the pressure in the chamber 7a is balanced with that of the chamber 6a, that is, substantially with the substantially constant pressure P prevailing in the volume 6a+29.

This pressure P will therefore be established in the chamber 7a and will communicate with the chamber 6b in which the pressure will also correspond to this value P. Therefore the second stage will finally tend to establish in the chamber 7b a pressure balancing the pressure in the chamber 6a, that is, balancing the pressure P. Thus, the pressure in the chamber 7b, that is, the pressure in the aperture 34, will be substantially constant.

The function of the jets or orifices 19a, 19b is, as is known, to maintain a slight current of gas inside the regulated pressure chambers 7a, 7b, so that the slide never operates too near its seating, which could lead to an unstable regulation.

It will also be observed that the theoretical regulating pressure can be modified by modifying the pressure P inside the buffer cylinder 29 by means of valves 31, 33.

In order to maintain the pressure P substantially constant, it is of utility to give the vessel containing P a large capacity and to insulate it so as to shield it from variations in surrounding temperature, and to provide suitable dimensions for the intervals 13a, 13b and the orifices 19a, 19b.

Although a specific embodiment of the invention has been described, many modifications and changes may be made therein without departing from the scope of the invention as defined in the appended claims.

Thus, although the pilot regulator and the main regulator have identical shapes and sizes, the invention could be embodied in forms in which the valves 8a and 8b have different sizes, and also in which the capacities of the chambers of the main regulator are different to that of the chambers of the pilot regulator.

Having now described my invention what I claim as new and desire to secure by Letters Patent is:

1. In an air pressure regulator adapted to be inserted between a supply service supplying gas under pressure and a utilization apparatus or system; said air pressure regulator comprising a first and a second regulator consisting respectively of a pilot regulator and a main regulator, each of said first and second regulators comprising a reference pressure chamber and a regulated pressure chamber, said two chambers being separated by a movable wall; two regulating valves; two needles, the ends of each of said needles bearing respectively on the movable wall and the regulating valve of each of said regulators; each of said regulating valves comprising a valve housing having a lateral wall and an end wall, a valve slide movable inside said valve housing, frictionless guiding means interposed between said valve slide and the lateral wall of said valve housing and bellows interposed between said valve slide and the end wall of said valve housing; said valve slide having an annular end and said regulating valve further comprising a fixed annular seating spaced from said annular end by a small regulatable annular interval, inner conduit means communicating with the inside of said annular interval and with the regulated pressure chamber of the corresponding regulator, and outer conduit means communicating with the outside of said annular interval and adapted to be connected to said supply device for communication therewith.

2. A regulating valve according to claim 1 wherein said anti-friction means are balls.

3. A regulating valve according to claim 1 wherein the slide has an aperture communicating with the inside of the bellows and with the inside of said annular interval.

References Cited in the file of this patent

UNITED STATES PATENTS

| | | |
|---|---|---|
| 2,047,101 | Grove | July 7, 1936 |
| 2,163,597 | Grove | June 27, 1939 |
| 2,248,592 | Stettner | July 8, 1941 |
| 2,599,577 | Norgren | June 10, 1952 |
| 2,631,412 | Work | Mar. 17, 1953 |
| 2,707,966 | Taplin | May 10, 1955 |
| 2,841,173 | Masom | July 1, 1958 |
| 2,891,569 | Goodner | June 23, 1959 |
| 2,984,252 | Bryant | May 16, 1961 |

FOREIGN PATENTS

| | | |
|---|---|---|
| 708,143 | Great Britain | Apr. 28, 1954 |